United States Patent [19]

Bolto et al.

[11] 4,206,051

[45] Jun. 3, 1980

[54] PROCESS FOR DEMINERALIZING SALINE SOLUTIONS

[75] Inventors: Brian A. Bolto, Mitcham; Kurt H. Eppinger, Bentleigh East; Mervyn B. Jackson, West Brunswick, all of Australia

[73] Assignees: ICI Australia Limited, Melbourne; Commonwealth Scientific and Industrial Research Organization, Campbell, both of Australia

[21] Appl. No.: 970,869

[22] Filed: Dec. 18, 1978

[30] Foreign Application Priority Data

Jan. 10, 1978 [AU] Australia .............................. PD2991

[51] Int. Cl.² ............................................. B01D 19/00
[52] U.S. Cl. .................................. 210/26; 210/30 R; 210/32; 210/37 R; 210/38 R; 521/26; 521/38; 526/923
[58] Field of Search ................... 210/24, 30 R, 32, 36, 210/37, 38, 26; 521/26, 29, 38; 526/90, 219, 237, 237.1, 261, 274, 287, 291, 311, 320, 328.5, 332, 923, 75, 277, 295, 296, 310; 204/159.22, 159.23

[56] References Cited

U.S. PATENT DOCUMENTS

| | | | |
|---|---|---|---|
| 2,841,550 | 7/1958 | Beohner | 210/26 |
| 3,183,184 | 5/1965 | Fisher | 210/26 |
| 3,619,394 | 11/1971 | Battaerd | 526/310 X |
| 3,716,481 | 2/1973 | Battaerd | 210/32 |
| 3,957,699 | 5/1976 | Solomon et al. | 526/311 X |
| 4,087,357 | 5/1978 | Barrett et al. | 210/32 |
| 4,121,986 | 10/1978 | Battaerd | 526/310 X |

FOREIGN PATENT DOCUMENTS

295961  11/1967  Australia .................................... 210/32

*Primary Examiner*—Robert H. Spitzer
*Assistant Examiner*—F. H. Lander
*Attorney, Agent, or Firm*—Cushman, Darby & Cushman

[57] ABSTRACT

A process for demineralizing an aqueous saline solution containing a deoxygenating agent by treating it with a thermally regenerable ion-exchange resin comprising a resinous material derived from a substituted diallylamine.

16 Claims, No Drawings

PROCESS FOR DEMINERALIZING SALINE SOLUTIONS

This invention relates to the demineralization of aqueous saline solutions, and more particularly it relates to such solutions comprising a deoxygenating agent.

It is known that saline solutions may be demineralized in part by treating them with resinous material capable of acting as an ion-exchange material. One such method whereby saline solutions may be demineralized is one in which the resinous material is a thermally regenerable resin. Processes in which such resins are used are sometimes referred to as the "Sirotherm" process ("Sirotherm" is a Registered Trade Mark of ICI Australia Limited) and references to these processes are available in publications such as Australian Patent Specifications No. 274 029 and 434 130.

| "An Ion Exchange Process with Thermal Regeneration" | | |
| --- | --- | --- |
| Part I | J. Inst. Engr. Aust | (1965) 37, 193 |
| Part II | Aust. J. Chem. | (1966) 19, 561 |
| Part III | " | (1966) 19, 589 |
| Part IV | " | (1966) 19, 765 |
| Part V | " | (1966) 19, 791 |
| Part VI | " | (1968) 21, 2703 |
| Part VII | Desalination | (1970) 8, 21 |
| Part VIII | " | (1973) 12, 217 |
| Part IX | " | (1973) 13, 269 |
| or | | |
| "Desalination by Thermally Regenerable Ion Exchange" | | |
| Proc. Roy. Aust. Chem. Inst. | | (1976) 43, 345 |

Such thermally regenerable resins characteristically comprise one or more resinous components which provide both basic and acidic ion exchange sites. Such resinous components are commonly derived from unsaturated monomers. A preferred type of such a monomer which yields a resin with basic ion exchange sites is one of the allylamine type such as triallylamine, diallylamine or derivatives thereof. Such resins of the poly(allylamine) class and their application in the socalled "Sirotherm" process are described for example in U.S. Pat. Nos. 3,619,394, 3,716,481 or 3,957,699. Such poly(allylamine) resins have been used successfully in the demineralization of a wide range of saline solutions especially naturally occurring saline solutions. However it has been observed that for some saline solutions it has been difficult to effect a reasonable degree of demineralization of the solutions. Thus for example in the instance where a saline solution has been treated with an excess of a deoxygenating agent such as a sulphite or bisulphite prior to being subjected to a demineralization treatment with a thermally regenerable ion-exchange resin comprising poly(triallylamine), it has been found that such a resin deteriorates as a demineralization agent at an unacceptably high rate.

Surprisingly however it has been found that, despite the relative inefficiency of ion-exchange materials comprising poly(triallylamine), certain other allylamine based ion-exchange resins are effective as agents for the demineralization of saline solutions comprising a deoxygenating agent. One class of resins suitable for use as agents for treating such saline solutions is a class consisting of resins derived from a substituted diallylamine or a salt thereof.

Accordingly the present invention provides an improvement in the process for the demineralization of a saline solution by thermally regenerable resins wherein, in a first step, the said saline solution is treated with a deoxygenating agent and wherein, in a second step the this deoxygenated saline solution is treated with a thermally regenerable ion exchange resin, the said improvement being that the said ion exchange resin comprises a component resin derived from a compound selected from a group consisting of N- substituted diallylamines and salts thereof.

Suitable N- substituted diallylamines include alkyldiallylamines, aralkyldiallylamines, and bis(N,N-diallylamino) alkanes.

Typical monomeric representatives of the above class include, (the preferred monomers are marked with an asterisk)
methyldiallylamine,
ethyldiallylamine,
n-propyldiallylamine*,
isopropyldiallylamine*,
n-butyldiallylamine,
benzyldiallylamine,
1,4-bis(N,N-diallylamino)butane,
1,6-bis(N,N-diallylamino)hexane*,
1,4-bis(N,N-diallylaminomethyl)benzene,
1,2,4-tris(N,N-diallylaminomethyl)benzene,
1,3,5-tris(N,N-diallylaminomethyl)benzene,
2,4,6-tris(N,N-diallylaminomethyl)toluene,
N-(4-N,N-dimethylaminomethylbenzyl)diallylamine,
N-(4-N,N-dipropylaminomethylbenzyl)diallylamine,
N-(4-N,N-diisopropylaminomethylbenzyl)diallylamine,
N-(4-N,N-diallylaminomethylbenzyl)diallylamine, and
N-(4-N,N-dimethylbenzyl)diallylamine.

The nature of the N-substituted diallylamine salt from which the resinous material may be derived is not narrowly critical and suitably such a salt is one of a strong acid such as hydrochloric, sulphuric, nitric or phosphoric acid.

The resinous materials may be crosslinked in part prior to being used in a process of the invention and conveniently the degree of crosslinking may be in a range from about 2 to 25%, and frequently in a range from 2 to 10%, on a molar basis with respect to the polymer: the crosslinking moiety being, for example, aromatic such as p-xylylene or aliphatic such as hexamethylene.

The process of the invention is particularly useful when the deoxygenating agent is an inorganic material. Such an agent may be present in the solution as a fluid, typically a gas, or as a dissolved solid and such agents include sulphur dioxide, sulphites such as an alkali metal sulphite, or bisulphites such as sodium bisulphite, potassium bisulphite or sodium metabisulphite.

The thermally regenerable ion exchange resin used in the process of this invention may be of the mixed bed resin type which comprises a mixture of acidic and basic ion exchange resins, or of the 'plum pudding' type, as described in Australian Pat. No. 434,130, which comprise acidic and basic ion exchange resins in an inactive matrix, or composite no-matrix resins in which the acidic and basic ion exchange sites are chemically linked to the resinous support material.

The process of the invention may be performed using thermally regenerable resins the basic ion exchange component of which is a polymer derived from one of the monomers listed. However it also lies within the invention that the ion-exchange resin used in the process of the invention may be a copolymer.

As taught in Example 9 of U.S. Pat. No. 3,957,699 there may be prepared copolymers derived from bis(N,N-diallylamino)-1,6-hexane and a range of alkyl-substituted diallylamines. Suitable copolymers of this type include those listed in Table 1 which sets out the alkyl-substituted diallylamine, the %w/w of the bis(N,N-diallylamine)-1,6-hexane component and the ion-exchange capacity of the copolymer.

TABLE 1

| Substituted Diallylamine | % Bisdiallyl component | Capacity meq/gram |
|---|---|---|
| Methyldiallylamine | 10 | 8.4 |
| Ethyldiallylamine | 10 | 7.8 |
| Propyldiallylamine | 10 | 6.7 |
| n-Butyldiallylamine | 20 | 5.5 |

Another type of ion-exchange resin suitable for use in our process is the type obtained by the polymerization of salts of bis(diallylamino)alkanes. Thus typical polymers of this type include poly[(allyl)$_2$N—(CH$_2$)$_3$—N(allyl)$_2$] which has an ion-exchange capacity of 7.75 milliequivalents per gram and poly[(allyl)$_2$N—(CH$_2$)$_{10}$—N-(allyl)$_2$] which has an ion-exchange capacity of 4.32 milliequivalents per gram.

The invention is now illustrated by, but is not limited to, the following examples wherein all parts and percentages are expressed on a weight basis unless otherwise specified. Examples 14, 19 and 20 do not lie within the invention and are included for the purposes of comparison.

EXAMPLES 1 to 13

These examples illustrate by comparison with example 14 the improved degree of resistance to bisulphite of basic ion exchange resins, such as may be used as a component of the thermally regenerable ion exchange resins used in the process of this invention.

The resistance of the basic ion exchange resins to bisulphite degradation is measured by contacting the resins with an excess of a 2% w/w bisulphite solution at pH 5 for at least one day and then determining the sulphur up-take of the resin. Sulphur taken up by the resin blocks the exchange sites, hence the greater the uptake the greater the degradation of the resin by bisulphite. A low sulphur uptake (less than 5%) indicates a good resistance to bisulphite attack.

Table 2 records the sulphur uptakes of several resins made by copolymerizing N-substituted diallylamines and bis(N,N-diallylamine)-1,6-hexane or triallylamine.

TABLE 2

| Example No | Poly-(R-diallylamine) R= | Crosslinking Mole % Hexa* | % S w/w |
|---|---|---|---|
| 1 | H | 20 | 2.3 |
| 2 |  | 10 | 1.4 |
| 3 |  | 5 | 1.1 |
| 4 |  | 2.5 | 0.6 |
| 5 |  | 2 | 0.4 |
| 6 | Me | 20 | 1.0 |
| 7 |  | 10 | 0.5 |
| 8 |  | 5 | 0.2 |
| 9 | Pr | 7.5 | 0.9 |
| 10 |  | 5 | 1.0 |
|  |  | Mole % triallylamine |  |
| 11 | Me | 20 | 3.5 |
| 12 |  | 10 | 1.6 |
| 13 |  | 5 | 1.0 |

*hexa = bis(N,N-diallylamine)-1,6-hexane

EXAMPLE 14

By way of comparison to examples 1 to 13, a basic ion-exchange resin comprising poly(triallylamine) was made.

The sulphur uptake of this resin by the bisulphite resistance test was 10.3% S, w/w.

EXAMPLE 15

This example illustrates the process of the invention using a 'plum pudding' type thermally regenerable resin.

A mixture of an amount of propyldiallylamine and 5% of its molar weight of bis(N,N-diallylamine)-1,6-hexane was polymerized by conventional means as in example 10, to provide particles which were substantially spherical in shape and had diameters in a range from 1 to 10 microns. Using the teachings set out in Australian Pat. No. 434,130 a thermally regenerable ion-exchange resin was prepared by encapsulating the particles with finely ground particles of polyacrylic acid in a matrix of polyvinyl alcohol. The ion-exchange resin so obtained had a thermal salt uptake capacity, as measured at temperatures of 20° C. and 80° C., of 0.215 milliequivalent per milliliter of resin. An amount of this resin which occupied a volume of 150 milliliters was converted to a free acid/chloride form and was then added to a solution prepared by dissolving 85.5 grams of sodium metabisulphite in 1000 milliliters of water and adjusting the pH thereof to a value of 5.0. The saline slurry so obtained was placed in a closed glass jar and shaken at room temperature for 4 days. At the end of this period the treated resin so obtained was separated from the solution and washed with 2 N hydrochloric acid to remove any residual amount of the de-oxygenating species from the resin.

The thermal salt uptake capacity of the treated resin, as measured at temperatures of 20° C. to 80° C., was 0.207 milliequivalent per milliliter of treated resin. This example demonstrates that the resin was essentially unaffected, in terms of its thermal salt uptake capacity, by prolonged exposure to a saline solution containing a high concentration of a strong deoxygenating agent.

EXAMPLE 16

An amount of the treated resin obtained in Example 15 was placed in a water jacketed cylindrical desalination column having a length to diameter ratio of 10:1. A saline feed water was prepared by dissolving sodium chloride in water so that the feed water contained 10 milliequivalents of sodium chloride per liter. This feed water was then deoxygenated by vacuum deaeration until it contained less than 0.1 milligram per liter of dissolved oxygen, and thereafter there was added to and dissolved in the deoxygenated feed water sufficient sodium metabisulphite to provide a concentration of 25 milligrams per liter of metabisulphite ion. By a conventional procedure used with ion-exchange resins of the "Sirotherm" type the feed water so obtained was fed into the desalination column for a multiplicity of cycles comprising an absorption step at a temperature of 20° C. and of 88 minutes duration, followed by a regeneration step at a temperature of 80° C. and of 22 minutes duration.

Analysis of the treated water so obtained under steady state conditions showed that the treated resin had an ion-exchange capacity of 0.99 milliequivalent per gram of dry treated resin.

When the above procedure was repeated in a comparative trial using the untreated ion-exchange resin of Example 15 and using a feed water which contained no metabisulphite ion, the ion-exchange capacity of the untreated resin was 1.05 milliequivalents per gram of dry resin. This example demonstrates that the resin was essentially unaffected, in terms of its ion-exchange capacity, when used as an ion-exchange material to demineralize solutions containing a deoxygenating agent.

EXAMPLE 17

The general procedure of Example 15 was repeated except that the polyacrylic acid component of the ion-exchange resin of that example was replaced by poly(methacrylic acid) in the form of substantially spherical particles having a diameter in a range from 1 to 2 microns. The thermal salt uptake capacity of the untreated resin was 0.171 milliequivalent per milliliter of resin, whilst the thermal salt uptake capacity of the treated resin was 0.167 milliequivalent per milliliter or resin.

EXAMPLE 18

The general procedure of Example 16 was repeated except that the ion-exchange resin of that Example was replaced by the ion-exchange resin of Example 17. The ion-exchange capacity of the untreated resin was 1.05 milliequivalents per gram of dry resin and the ion-exchange capacity of the treated resin was 1.00 milliequivalent per gram of dry resin.

EXAMPLE 19

In this comparative Example the general procedure of Example 15 was repeated except that the poly-(propyldiallylamine) component of the ion-exchange resin of that example was replaced by poly(triallylamine) in the form of substantially spherical particles having a diameter in a range from 1 to 10 microns. The thermal salt uptake capacity of the untreated resin was 0.287 milliequivalent per milliliter of resin, whilst the thermal salt uptake capacity of the treated resin was 0.01 milliequivalent per milliliter of resin.

This example demonstrates that resins derived from triallylamine are unsuitable for use as demineralizing agents when exposed to solutions containing a high concentration of a strong de-oxygenating agent.

EXAMPLE 20

In this comparative Example the general procedure of Example 16 was repeated except that the ion-exchange resin of that Example was replaced by the ion-exchange resin of Example 19. The ion-exchange capacity of the untreated resin was 0.71 milliequivalent per gram of dry resin, whilst the ion-exchange capacity of the treated resin was less than 0.01 milliequivalent per gram of dry resin. This example demonstrates that resins derived from triallylamine are unsuitable as ion-exchange resins when used with solutions containing a deoxygenating agent.

EXAMPLE 21

The general procedure of Example 16 was repeated except that the poly(propyldiallylamine) component of the ion-exchange resin of that Example was replaced by the poly-(methyldiallylamine) of example 12. The ion-exchange capacity of the untreated resins was 0.65 milliequivalent per gram of dry resin, and after treatment the ion-exchange capacity of the resin was virtually unchanged.

We claim:

1. An improvement in the process for the demineralization of a saline solution by thermally regenerable resins wherein, in a first step, the saline solution is treated with a deoxygenating agent and wherein, in a second step, the thus deoxygenated saline solution is treated with a thermally regenerable ion exchange resin, the said improvement being that the said ion exchange resin comprises a component resin derived from a compound selected from a group consisting of N-substituted diallylamines and salts thereof.

2. A process according to claim 1 wherein said N-substituted diallylamine is selected from the group consisting of alkyldiallylamines, aralkyldiallylamines and bis(N,N-diallylamino)alkanes.

3. A process according to claim 2 wherein the said alkyldiallylamine comprises an alkyl moiety containing from 1 to 4 carbon atoms.

4. A process according to claim 3 wherein the said alkyl moiety is propyl.

5. A process according to claim 1 wherein said N-substituted diallylamine salt is a salt of a strong acid.

6. A process according to claim 5 wherein said strong acid is one selected from the group consisting of hydrochloric acid, sulphuric acid, nitric acid and phosphoric acid.

7. A process according to claim 1 wherein said ion exchange resin is a polymer crosslinked in a range from 2 to 25 percent on a molar basis with respect to the polymer.

8. A process according to claim 7 wherein said ion exchange resin is a polymer crosslinked in a range from 2 to 10 percent in a molar basis with respect to the polymer.

9. A process according to claim 1 wherein said deoxygenating agent is an inorganic material.

10. A process according to claim 9 wherein said deoxygenating agent is a sulphurous material.

11. A process according to claim 10 wherein said deoxygenating agent is a compound selected from a group consisting of sulphur dioxide, alkali metal sulphites, and alkali metal meta-bisulphites.

12. A process according to claim 1 wherein said component resin is a homopolymer.

13. A process according to claim 1 wherein said component resin is a copolymer.

14. A process according to claim 13 wherein said copolymer is derived from bis(N,N-diallylamino)-1,6-hexane.

15. A process according to claim 1 wherein said thermally regenerable ion exchange resin is a 'plum pudding' resin comprising basic and acidic component ion exchange resins in a resin matrix.

16. A process according to claim 1 wherein said thermally regenerable ion exchange resin is a composite, no-matrix resin.

* * * * *